Feb. 14, 1961 A. E. ANTUNEZ, JR 2,971,525
FLOAT-OPERATED VALVE
Filed Jan. 5, 1959

INVENTOR.
ARMAND E. ANTUNEZ JR
BY
ATTORNEYS though is to be in Office 2,971,525
Patented Feb. 14, 1961

2,971,525
FLOAT-OPERATED VALVE
Armand E. Antunez, Jr., 20123 E. Sierra Madre, Ave., Glendora, Calif.
Filed Jan. 5, 1959, Ser. No. 784,966
5 Claims. (Cl. 137—217)

This invention relates to float-operated valves, more particularly to inlet valves for toilet flush tanks, and included in the objects of this invention are:

First, to provide a float-operated valve which, although incorporating an anti-siphonic feature, comprises a minimum number of parts which are easily manufactured.

Second, to provide a float-operated valve wherein the valve element which controls inflow of water is located in the center of a relatively large, yieldable, perforated membrane dividing the valve housing into an upper anti-siphonic chamber and a lower inlet chamber, and wherein incoming water passes through the perforated membrane to effect immediate closure of an anti-siphonic check valve means in the anti-siphonic chamber.

Third, to provide a float-operated valve of this class wherein the anti-siphonic check valve means after closing in response to opening of the water supply valve, remains closed even under conditions of a low rate of water inflow, such as occurs as the supply valve is gradually closed, so as to eliminate momentary leakage of the anti-siphonic check valve during the closing period of the supply valve.

Fourth, to provide a valve of this class which is inherently quiet in operation.

Fifth, to provide an anti-siphonic float-operated valve which, although it may be in operation for a long period of time before function of its anti-siphonic check valve is needed, can be depended upon to function as an anti-siphonic valve whenever the need should arise.

With the above and other objects in view, as may appear hereinafter, reference is directed to the accompanying drawings in which.

Figure 1:
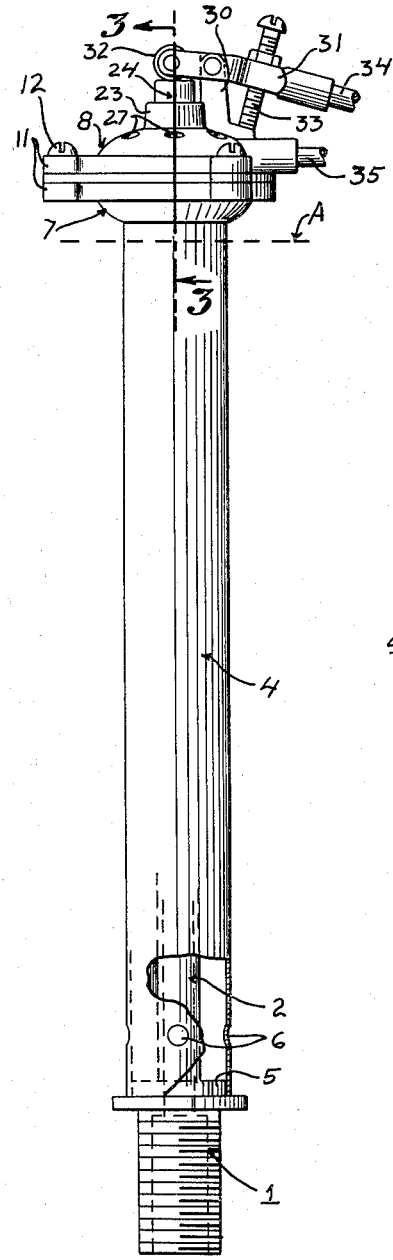
Figure 1 is a side view, partially in section, of the float-operated valve.
Figure 2:
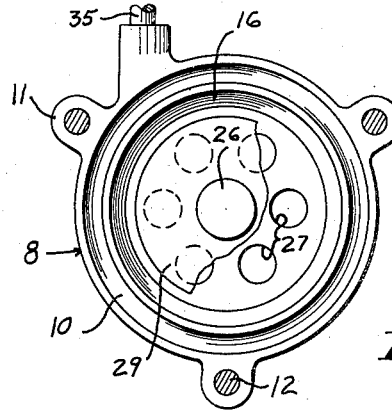
Figure 2 is an enlarged sectional view through 2—2 of Figure 3 showing the upper portion of the valve.

The float-operated valve is adapted to be mounted in a toilet flush tank and includes an inlet fitting 1 which is secured in the bottom of the flush tank in a conventional manner. Secured to the inlet fitting 1 is an upstanding inlet tube 2 which is provided at its upper end with a valve seat fitting 3. Surrounding the inlet tube 2 and concentric therewith is an outlet tube 4, the lower end of which is centered by means of a shoulder 5 provided at the upper portion of the inlet fitting 1. Near its lower end, the outlet tube 4 is provided with outlet ports 6.

Mounted at the upper ends of the inlet and outlet tubes 2 and 4 is a valve structure which includes a lower valve housing 7 and an upper valve housing 8. The valve housings are similarly cup-shaped and are provided with marginal rims 9 and 10. Radial lugs 11 extend from the rims 9 and 10, and screws 12 extend through these lugs to join the housings.

The rims 9 and 10 are provided with confronting annular grooves, and a membrane 13 having an annular bead 14 is interposed between the housings with its annular bead 14 fitting the confronting annular grooves formed in the rims 9 and 10. The annular bead forms a seal between the two housings 7 and 8. The membrane 13 divides the interior of the housings into a lower inlet chamber 15 and an upper anti-siphon chamber 16.

The lower valve housing 7 is provided with an external lip 17 which fits within the outlet tube 4. The lower valve housing is also provided with an internal lip 18 concentric with the external lip 17. The internal lip projects upwardly towards the membrane 13. Within the annulus formed by the external and internal lips the lower valve housing 7 is provided with a web 19 having a central opening to receive the inlet tube 2 and valve seat fitting 3, and a ring of outlet openings 20 which communicate between the inlet chamber 15 and the annular space between the inlet tube 2 and outlet tube 4.

The membrane 13 normally occupies a position slightly above the upper end of the valve seat fitting 3 and is provided on its underside with a rudimentary boss which forms a valve seat element 21 adapted to engage and seal against the valve seat fitting 3 when the membrane 13 is depressed. The membrane 13 is provided with perforations 22, the major portions of which are within the projected area of the internal lip 18.

The upper valve housing 8 is provided with a centered upwardly extending tubular guide boss 23 in which is slidably mounted a plunger 24. Within the upper valve housing 8, the plunger 24 is reduced in diameter to form a stem 25, and its lower end terminates in a foot 26 having a flat surface so as to press against the membrane 13 and force the valve element 21 thereof into sealing engagement with the valve seat fitting 3.

Figure 3:
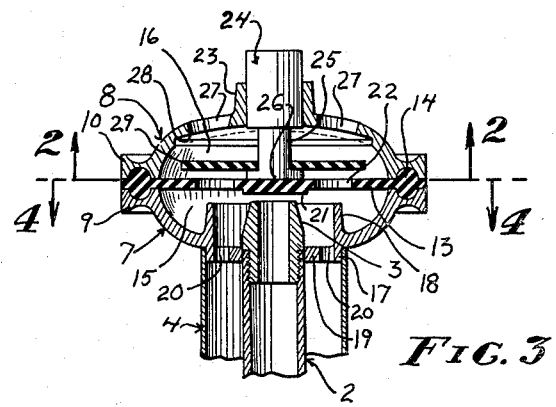
Figure 3 is an enlarged, fragmentary, sectional view through 3—3 of Figure 1.
Figure 4:
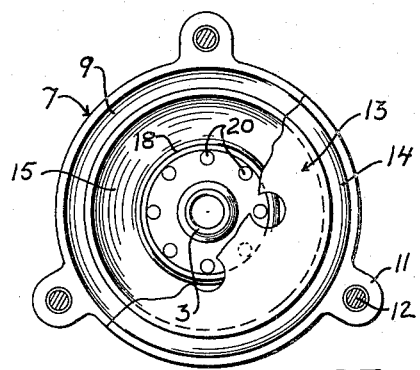
Figure 4 is an enlarged sectional view taken through 4—4 of Figure 3 showing the lower portion of the valve.

The upper valve housing 8 is provided with a ring of anti-siphon ports 27 surrounding the guide boss 23. The under surface of the valve housing 8 embracing the area of the ring of ports 27 is machined to form a valve seat 28. Slidably mounted on the stem 25 is an anti-siphon check valve disc 29 formed of rubber, or the like, and of such diameter as to close the ring of ports 27, as indicated by dotted lines in Figure 3, when the disc 29 is forced upwardly against the valve seat 28.

The upper valve housing 8 is provided with an upwardly extending post 30 located at one side of the guide box 23. The post journals a lever 31, one end of which is provided with a roller 32 which engages the upper end of the plunger 24. The lever 31 receives a stop screw 33 which is adjustable to limited movement of the lever 31. The extended end of the lever 31 receives a float rod 34 at the extremity of which is mounted a float, not shown. Also extending from the upper valve housing 8 is a laterally directed tube 35 of small diameter through which water flows to refill the toilet bowl during refilling of the flush tank.

Operation of the float-operated valve is as follows:

Inasmuch as the conventional toilet flush tank is normally filled with water, the valve normally occupies a closed position. That is, upward force exerted by reason of the buoyancy of the float causes the roller 32 to press downward on the plunger 24 and force the foot 26 against the membrane 13 so that the valve element 21 sealingly engages the valve seat fitting 3.

Upon lowering the water level in the flush tank, the plunger 24 is permitted to move upward allowing water to enter through the inlet tube 2 and fitting 3. The water, in flowing into the inlet chamber 15, also passes through the perforations 22 in the membrane 13 and causes the check valve disc 29 to move upward and seal the anti-siphon ports 27. The water therefore is forced to discharge through the outlet openings 20, pass downwardly between the inlet tube 2 and outlet tube 4, and flow into the toilet flush tank through the outlet ports 6. As the flush tank is refilled with water, the float gradually rises causing the roller 32 to force the plunger 24 downward until the valve element 21 again seals against the valve seat fitting 3.

The normal water level within the toilet flush tank is below the line A, indicated in Figure 1. As a consequence, the water within the outlet tube 4 seeks the same level and thus drains from the anti-siphon chamber 16 and inlet chamber 15 of the valve housings. This permits the anti-siphon check valve disc 29 to drop to a position slightly below the solid line position shown in Figure 3, inasmuch as the valve element 21 is in engagement with the valve seat fitting 3. Under these conditions, should a negative pressure exist in the inlet tube 2 and the valve formed by the fitting 3 and element 21 be opened, there can be no siphoning of water from the flush tank for the reason that air may readily enter through the ports 27 and perforations 22, breaking any siphon that would otherwise be created.

It should be observed that the valve element 21 tends to deflect the water issuing from the valve seat fitting 3 in a downward cone which is in turn deflected in an upward cone, portions of which pass through the openings 22 to impart an upward kinetic force to the disc 29 so as to drive the disc 29 quickly into sealing engagement with the anti-siphon ports 27. This dynamic action of the incoming water occurs particularly during the interval immediately following opening of the valve seat fitting 3 before the incoming water has had opportunity to fill the chambers 15 and 16.

It will be noted that the outlet openings 20 are comparatively small in individual and total area so as to ensure back pressure in the chambers 15 and 16 sufficient to maintain the anti-siphon ports closed during normal operation of the valve.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A valve construction, comprising: complementary upper and lower housing members, said lower housing member having restricted outlet ports, said upper housing member having anti-siphon ports; a yieldable apertured membrane interposed between said housing members to define therewith a lower inlet chamber and an upper anti-siphon chamber; an inlet tube extending into said lower housing and inlet chamber and terminating in a valve seat confronting said membrane, the confronting portion of said membrane forming a valve element engageable with said valve seat; a plunger slidably mounted in said upper housing member and engageable with said membrane to urge said valve element against said valve seat; and a yieldable check valve loosely mounted on said plunger and upwardly movable by the force of water passing through said apertured membrane to close said anti-siphon ports during flow of water into said inlet chamber from said inlet tube and out of said inlet chamber through said restricted outlet ports.

2. A valve construction, comprising: complementary upper and lower housing members; a yieldable apertured membrane interposed between said housing members to define therewith a lower inlet chamber and an upper anti-siphon chamber; an inlet tube extending into said lower housing and inlet chamber and terminating in a valve seat confronting said membrane, the confronting portion of said membrane forming a valve element engageable with said valve seat; said lower housing member including an upwardly directed lip spaced from said inlet tube and having an upper extremity confronting said membrane, and having a ring of downwardly directed restricted outlet ports between said inlet tube and lip; a plunger slidably mounted in said upper housing member and engageable with said membrane to urge said valve element against said valve seat; said upper housing member having a ring of anti-siphon ports surrounding said plunger; and a yieldable check valve loosely mounted on said plunger and upwardly movable by the force of water passing through said apertured membrane to close said anti-siphon ports during flow of water into said inlet chamber from said inlet tube and out of said inlet chamber through said restricted outlet ports.

3. An anti-siphon valve construction, comprising: a coaxial inlet tube and outlet tube; a housing structure mounted on said tubes; an inlet port for said inlet tube; restricted outlet ports for said outlet tube communicating with the annulus between said inlet and outlet tubes; an apertured yieldable membrane dividing said housing structure into an upper anti-siphonic chamber and a lower inlet chamber, the central portion of said membrane overlying said inlet port for sealing engagement therewith; float-operated means for causing the central portion of said membrane to engage said seat; and check valve means including an anti-siphonic port in said anti-siphonic chamber and a valve element normally clearing said port but responsive to fluid pressure in said chambers during flow from said inlet through said restricted outlet ports to close said anti-siphonic port.

4. A valve construction, comprising: complementary upper and lower housing members; a yieldable membrane interposed therebetween to define therewith a lower inlet chamber, and an upper antisiphon chamber; an inlet tube extending into said lower housing member and inlet chamber and terminating in a valve seat confronting the central portion of said membrane, said central portion forming a valve element engageable with said valve seat; a plunger slidably mounted in said upper housing member and engageable with said membrane to force said valve element against said valve seat; said upper housing member having an antisiphon bleed port therein; a check valve loosely mounted in said upper housing and upwardly movable to close said antisiphon port; said lower housing member having a restricted outlet port whereby, on opening of said valve element and valve seat for flow of water through said lower housing, a back pressure is created therein; and means interconnecting said lower and upper chambers to apply said back pressure to said check valve, thereby to close said check valve on flow of water between said inlet tube and outlet port.

5. A valve construction, comprising: complementary upper and lower housing members, each having a dished central portion and a peripheral channel; a yieldable membrane having a beaded periphery fitting sealingly into said channels and separating said dished central portions to define therewith a lower inlet chamber and an upper antisiphon chamber, said membrane having a central valve seat element and a perforation laterally thereof whereby said chambers are interconnected; an inlet member projecting upwardly into said inlet chamber and terminating in a valve seat confronting and cooperating with said valve element; float-controlled means for urging said valve element and valve seat into mutual engagement; means defining a restricted outlet from said inlet chamber thereby to establish through said perforation a back pressure in both of said chambers when said inlet member is opened; and antisiphon means including a port and a floating check valve in said antisiphon chamber responsive to said back pressure.

References Cited in the file of this patent
UNITED STATES PATENTS

| | | |
|---|---|---|
| 862,867 | Eggleston | Aug. 6, 1907 |
| 2,270,910 | Svirsly | Jan. 27, 1942 |
| 2,290,145 | Owens | July 14, 1942 |
| 2,306,508 | Svirsly | Dec. 29, 1942 |
| 2,707,481 | McPherson | May 3, 1955 |
| 2,730,117 | Svirsly | Jan. 10, 1956 |
| 2,875,977 | Stone | Mar. 3, 1959 |